(12) United States Patent
Lv et al.

(10) Patent No.: US 11,057,469 B2
(45) Date of Patent: Jul. 6, 2021

(54) METHOD AND APPARATUS FOR SERVICE HOSTING OF DISTRIBUTED STORAGE SYSTEM

(71) Applicant: BEIJING BAIDU NETCOM SCIENCE AND TECHNOLOGY CO., LTD., Beijing (CN)

(72) Inventors: Yi Lv, Beijing (CN); Li Yu, Beijing (CN); Zhiguang Hu, Beijing (CN)

(73) Assignee: BEIJING BAIDU NETCOM SCIENCE AND TECHNOLOGY CO, LTD., Beijing (CN)

( * ) Notice: Subject to any disclaimer, the term of this patent is extended or adjusted under 35 U.S.C. 154(b) by 222 days.

(21) Appl. No.: 16/457,447

(22) Filed: Jun. 28, 2019

(65) Prior Publication Data

US 2020/0036790 A1 Jan. 30, 2020

(30) Foreign Application Priority Data

Jul. 26, 2018 (CN) .......................... 201810835228.0

(51) Int. Cl.
*H04L 29/08* (2006.01)
*G06F 16/182* (2019.01)
*H04L 29/06* (2006.01)

(52) U.S. Cl.
CPC ...... *H04L 67/1097* (2013.01); *G06F 16/1824* (2019.01); *H04L 67/145* (2013.01); *H04L 67/42* (2013.01)

(58) Field of Classification Search
CPC ...... G06F 3/0659; G06F 3/0679; G06F 3/061; G06F 3/0611; G06F 3/068; G06F 3/0685; G06F 3/0655; G06F 12/0866; G06Q 10/087; G06Q 30/02
See application file for complete search history.

(56) References Cited

U.S. PATENT DOCUMENTS

2012/0331249 A1 12/2012 Benjamin et al.
2014/0298091 A1 10/2014 Carlen et al.

FOREIGN PATENT DOCUMENTS

| CN | 102693230 A | 9/2012 |
|---|---|---|
| CN | 103607429 A | 2/2014 |
| CN | 103810023 A | 5/2014 |
| CN | 104182283 A | 12/2014 |

(Continued)

*Primary Examiner* — Michael A Keller
*Assistant Examiner* — Thao D Duong
(74) *Attorney, Agent, or Firm* — Seed IP Law Group LLP

(57) ABSTRACT

Embodiments of the present disclosure disclose a method and apparatus for service hosting of a distributed storage system. A specific embodiment of the method comprises: acquiring, in response to receiving expected service description information for a target service, current service description information and at least one piece of tag information of at least one storage node; selecting a target storage node from the at least one storage node, tag information of the target storage node satisfying a storage node filtering condition in the expected service description information and/or a storage node filtering condition in the current service description information; determining a to-be-performed task of the target storage node, based on a difference between the expected service description information and the current service description information and software package information and container information in the expected service description information; and sending information for indicating the task to the target storage node.

15 Claims, 6 Drawing Sheets

(56) References Cited

FOREIGN PATENT DOCUMENTS

| | | |
|---|---|---|
| CN | 105187500 A | 12/2015 |
| CN | 107430528 A | 12/2017 |
| CN | 107786593 A | 3/2018 |
| CN | 107797767 A | 3/2018 |
| CN | 107908465 A | 4/2018 |
| CN | 108023742 A | 5/2018 |
| CN | 108170820 A | 6/2018 |
| CN | 108282527 A | 7/2018 |
| CN | 108319596 A | 7/2018 |
| WO | 2005/106666 A1 | 11/2005 |

METHOD AND APPARATUS FOR SERVICE HOSTING OF DISTRIBUTED STORAGE SYSTEM

CROSS-REFERENCE TO RELATED APPLICATIONS

This application claims priority to Chinese Application No. 201810835228.0, filed on Jul. 26, 2018 and entitled "Method and Apparatus for Service Hosting of Distributed Storage System," the entire disclosure of which is hereby incorporated by reference.

TECHNICAL FIELD

Embodiments of the present disclosure relate to the field of computer technology, and specifically to a method and apparatus for service hosting of a distributed storage system.

BACKGROUND

Service hosting refers to that a server and a related device are hosted in a network data center having perfect machine room facilities, a high-quality network environment, abundant bandwidth resources and operational experience and capable of monitoring the network and the device of a user in real time in order to improve the access speed of a website, thereby making a system run safely, reliably, stably and efficiently. The hosted server is maintained by the customer himself or maintained remotely by another authorized person. That is, the user purchases a server device and places the server device in the IDC (Internet Data Center) machine room of the local Telecom, Netcom or other operators.

The existing service hosting generally uses physical machine hosting, virtual machine hosting and container hosting. Some common problems of the container hosting are solved in a way of Docker (an open source application container engine)+Kubernetes (a distributed architecture based on a container technology). However, Docker+Kubernetes cannot be applied to the hosting of a storage node, because an upgrade of a Kubernetes instance is to change the machine and perform a re-creation, rather than to upgrade in place, which is unacceptable for a storage system.

SUMMARY

Embodiments of the present disclosure propose a method and apparatus for service hosting of a distributed storage system.

In a first aspect, the embodiments of the present disclosure provide a method for service hosting of a distributed storage system. The method includes: acquiring, in response to receiving expected service description information for a target service, current service description information and at least one piece of tag information of at least one storage node, service description information including: software package information, container information and a storage node filtering condition; selecting a target storage node from the at least one storage node, tag information of the target storage node satisfying a storage node filtering condition in the expected service description information and/or a storage node filtering condition in the current service description information; determining a to-be-performed task of the target storage node, based on a difference between the expected service description information and the current service description information, and software package information and container information in the expected service description information; and sending information for indicating the task to the target storage node, to cause the target storage node to perform the task.

In some embodiments, the task includes at least one of: creating an instance, deleting the instance, updating the instance or migrating the instance.

In some embodiments, the service description information further includes grading release information. Before the sending information for indicating the task to the target storage node, the method further includes: decomposing the task into at least one operation; and generating a directed graph according to grading release information in the expected service description information and the at least one operation, a node of the directed graph representing an operation.

In some embodiments, the grading release information includes at least one of: grouping information of the operation, concurrent information of the operation, plan suspension information of the operation, or disaster tolerant information of the operation.

In some embodiments, the tag information includes at least one of: a tag of the storage node, a property of the storage node or a label of an instance. The storage node filtering condition includes at least one of: an identifier of a machine room, an identifier of a storage node pool, a filtering condition of the tag of the storage node, a filtering condition of the property of the storage node, or a filtering condition of the label of the instance.

In some embodiments, the service description information further includes capacity expansion information. The method further includes: inspecting periodically a number of storage nodes having tag information satisfying the storage node filtering condition in the expected service description information from the at least one storage node; determining a to-be-newly-added target storage node based on the capacity expansion information, in response to inspecting the number of the storage nodes having the tag information satisfying the storage node filtering condition in the expected service description information from the at least one storage node increasing as compared with a previous inspection; and sending the information for indicating the task to the to-be-newly-added target storage node, to cause the to-be-newly-added target storage node to perform the task.

In some embodiments, the service description information further includes capacity reduction information. The method further includes: determining a to-be-reduced target storage node based on the capacity reduction information, in response to inspecting the number of the storage nodes having the tag information satisfying the storage node filtering condition in the expected service description information in the at least one storage node decreasing as compared with the previous inspection; and sending an instruction for representing a deletion on an instance for the target service to the to-be-reduced target storage node, to cause the to-be-reduced target storage node to delete the instance for the target service.

In some embodiments, the service description information further includes instance health inspection information. The method further includes: inspecting periodically a health status of an instance involved in the task, based on instance health inspection information in the expected service description information.

In some embodiments, the service description information further includes keep-alive information. The method further includes: restarting or migrating, in response to inspecting the health status of the instance involved in the task being unhealthy, the instance having the unhealthy status according to the keep-alive information.

In a second aspect, the embodiments of the present disclosure provide an apparatus for service hosting of a distributed storage system. The apparatus includes: an acquiring unit, configured to acquire, in response to receiving expected service description information for a target service, current service description information and at least one piece of tag information of at least one storage node, service description information including: software package information, container information and a storage node filtering condition; a selecting unit, configured to select a target storage node from the at least one storage node, tag information of the target storage node satisfying a storage node filtering condition in the expected service description information and/or a storage node filtering condition in the current service description information; a determining unit, configured to determine a to-be-performed task of the target storage node, based on a difference between the expected service description information and the current service description information, and software package information and container information in the expected service description information; and a sending unit, configured to send information for indicating the task to the target storage node, to cause the target storage node to perform the task.

In some embodiments, the task includes at least one of: creating an instance, deleting the instance, updating the instance or migrating the instance.

In some embodiments, the service description information further includes grading release information. The sending unit is further configured to: decompose the task into at least one operation before the information for indicating the task is sent to the target storage node; and generate a directed graph according to grading release information in the expected service description information and the at least one operation, a node of the directed graph representing an operation.

In some embodiments, the grading release information includes at least one of: grouping information of the operation, concurrent information of the operation, plan suspension information of the operation, or disaster tolerant information of the operation.

In some embodiments, the tag information includes at least one of: a tag of the storage node, a property of the storage node or a label of an instance. The storage node filtering condition includes at least one of: an identifier of a machine room, an identifier of a storage node pool, a filtering condition of the tag of the storage node, a filtering condition of the property of the storage node, or a filtering condition of the label of the instance.

In some embodiments, the service description information further includes capacity expansion information. The apparatus further includes a capacity expansion and capacity reduction unit, configured to: inspect periodically a number of storage nodes having tag information satisfying the storage node filtering condition in the expected service description information from the at least one storage node; determine a to-be-newly-added target storage node based on the capacity expansion information, in response to inspecting the number of the storage nodes having the tag information satisfying the storage node filtering condition in the expected service description information from the at least one storage node increasing as compared with a previous inspection; and send the information for indicating the task to the to-be-newly-added target storage node, to cause the to-be-newly-added target storage node to perform the task.

In some embodiments, the service description information further includes capacity reduction information. The capacity expansion and capacity reduction unit is further configured to: determine a to-be-reduced target storage node based on the capacity reduction information, in response to inspecting the number of the storage nodes having the tag information satisfying the storage node filtering condition in the expected service description information in the at least one storage node decreasing as compared with the previous inspection; and send an instruction for representing a deletion on an instance for the target service to the to-be-reduced target storage node, to cause the to-be-reduced target storage node to delete the instance for the target service.

In some embodiments, the service description information further includes instance health inspection information. The apparatus further comprises a health inspecting unit, configured to: inspect periodically a health status of an instance involved in the task, based on instance health inspection information in the expected service description information.

In some embodiments, the service description information further includes keep-alive information. The apparatus further comprises a keep-alive unit, configured to: in response to inspecting the health status of the instance involved in the task being unhealthy, restart or migrate the instance having the unhealthy status according to the keep-alive information.

In a third aspect, the embodiments of the present disclosure provide an electronic device. The electronic device includes: one or more processors; and a storage device, configured to store one or more programs. The one or more programs, when executed by the one or more processors, cause the one or more processors to implement the method described in any embodiment in the first aspect.

In a fourth aspect, the embodiments of the present disclosure provide a computer readable medium storing a computer program.

The program, when executed by a processor, implements the method described in any embodiment in the first aspect.

According to the method and apparatus for service hosting of a distributed storage system provided by the embodiments of the present disclosure, the target storage node is selected through the storage node filtering condition in the expected service description information provided by the user, and the corresponding deployment operations are generated by comparing the expected service description information with the service description information currently used by the system. The operations are combined into an online task for the target storage node to perform.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be described below in detail with reference to the accompanying drawings and in combination with the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
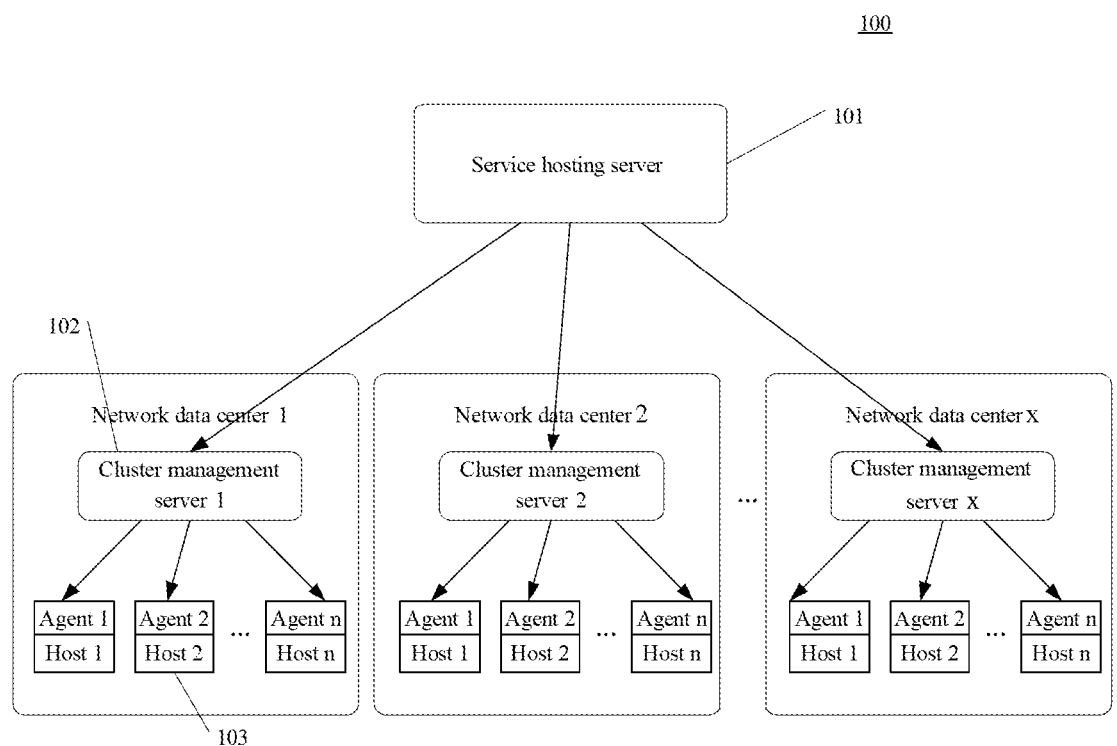
FIG. 1 is a diagram of an exemplary system architecture in which an embodiment of the present disclosure may be implemented.

FIG. 1 shows an exemplary system architecture 100 in which an embodiment of a method for service hosting of a distributed storage system or an apparatus for service hosting of a distributed storage system according to the present disclosure may be implemented.

As shown in FIG. 1, the system architecture 100 of a distributed storage system may include a service hosting server 101, a cluster management server 102 and a storage node 103. A network serves as a medium providing a communication link between the service hosting server 101, the cluster management server 102 and the storage node 103. The network may include various types of connections, for example, wired or wireless communication links, or optical fiber cables.

The distributed storage system decentralizes and stores data onto a plurality of independent storage nodes. A traditional network storage system stores all of the data using a centralized storage server. Accordingly, the storage server becomes a bottleneck of the system performance, and is also the focus of the reliability and the security, and thus cannot meet the needs of large-scale storage applications. A distributed network storage system adopts a extensible system structure, shares the storage load using a plurality of storage servers, locates the storage information using a location server, which not only improves the reliability, the availability and the access efficiency of the system but also makes the extension easy.

The storage node 103 is a storage server for storing data.

The cluster management server 102 is used to aggregate storage spaces of a plurality of storage nodes 103 into a storage pool capable of providing the service hosting server 101 with a unified access interface and a management interface.

The service hosting server 101 is used for virtualized hosting of the storage node, an automatic grayscale online upgrade, an automatic capacity adjustment, a high availability of the data of the storage node, etc., and may cooperate with an automated maintenance system for the fast data backup and migration of the storage node.

It should be noted that the method for service hosting of a distributed storage system provided by the embodiments of the present disclosure is generally performed by the service hosting server 101. Correspondingly, the apparatus for service hosting of a distributed storage system is generally provided in the service hosting server 101.

It should be appreciated that the numbers of the service hosting servers, the cluster management servers and the storage nodes in FIG. 1 are merely illustrative. Any number of service hosting servers, cluster management servers and storage nodes may be provided based on actual requirements.

Figure 2:
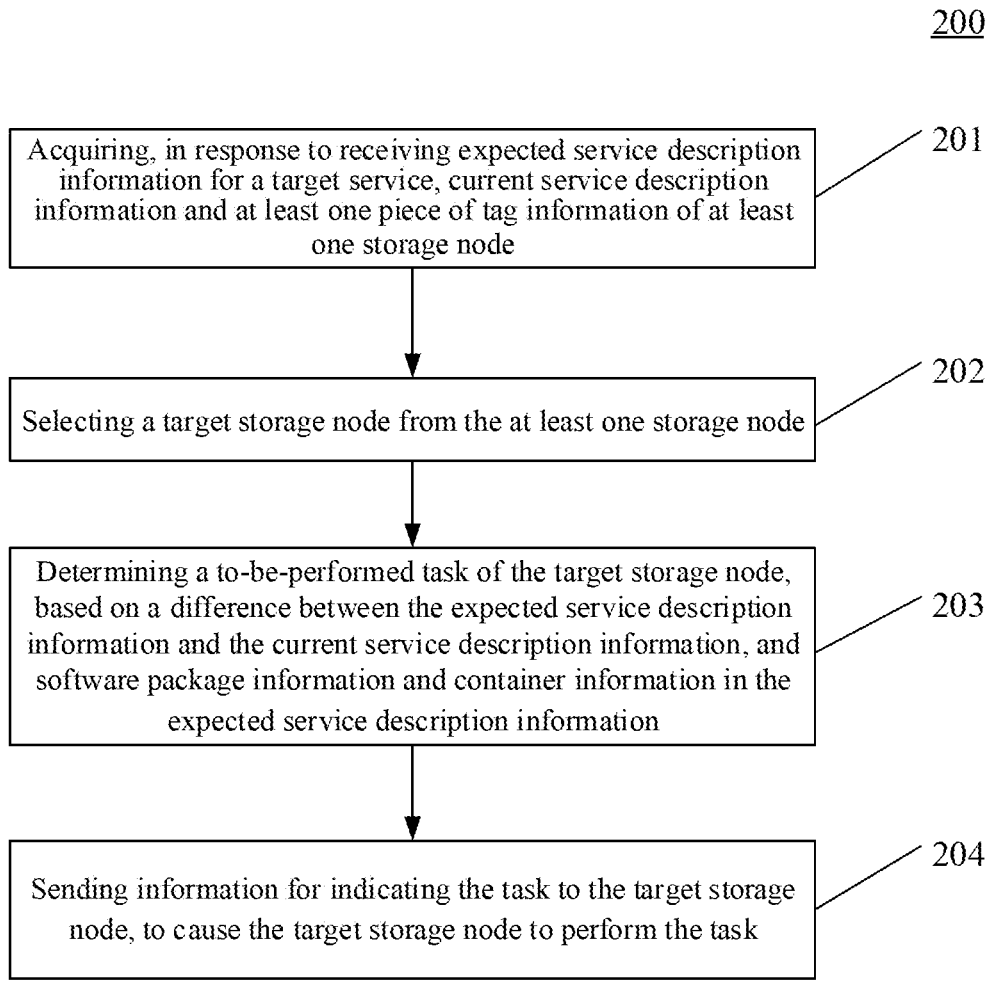
FIG. 2 is a flowchart of an embodiment of a method for service hosting of a distributed storage system according to the present disclosure.

Further referring to FIG. 2, a flow 200 of an embodiment of a method for service hosting of a distributed storage system according to the present disclosure is illustrated. The method for service hosting of a distributed storage system includes the following steps.

Step 201, acquiring, in response to receiving expected service description information for a target service, current service description information and at least one piece of tag information of at least one storage node.

In this embodiment, an executing body (e.g., the service hosting server shown in FIG. 1) of the method for service hosting of a distributed storage system may receive, from a terminal that a user uses for performing a hosting request, the expected service description information by means of a wired or wireless connection.

Here, the service description information includes: software package information, container information and a storage node filtering condition. The target service is a service that the user wants the storage node to implement, for example, a video-on-demand service. Different services are implemented through corresponding service description information. Then, the service hosting server acquires the service description information currently used by the distributed storage system and the at least one piece of tag information of the at least one storage node in the distributed storage system locally or from a third party server. The currently used service description information may be the already used service description information that is previously sent to the service hosting server by the user. If the service description information is not previously received, the current service description information is empty. The service description information may include the software package information and the container information. The service description information may further include instance health inspection information. The software package information may include the type, the version and the download address of a software package. The container information may include deployment information and resource information of a container.

The service description information is shown as follows, in which package represents the software package information, deploy represents the deployment information of the container, resource represents the resource information of the container, and monitor represents the instance health inspection information.

Package: the type, the version, the download address, etc. of the software package are described under #package.

Deploy: what user is deployed under what catalogue at the time of the actual deployment and a timeout are described under #deploy.

Resource: the resources such as a CPU, a memory, a disk and a network required when the instance runs are described under #resource.

Monitor: an approach of inspecting the health of the instance, a health inspection timeout or the like are described under #monitor.

The storage node filtering condition is used to select a storage node. The storage node corresponds to tag information. The tag information may include at least one of: a tag of the storage node, a property of the storage node or a tag of an instance. When the tag information of each storage node changes, it needs to be reported to the service hosting server or the third party server, so that the service hosting server may acquire the tag information of the each storage node at any time. The same tag may be placed on one or more storage nodes, which is represented by tag. For example, storage nodes 1, 2 and 3 are tagged as A. Storage nodes 4, 5 and 6 are tagged as B. The property of the storage node may be a key-value pair, which is represented by property, for example, k1:v1. The tag of the instance refers to that the user, when creating a service A, will designate a tag, which is represented by label. The storage node where the instance of the target service is located automatically obtains the corresponding label, to express an affinity or mutually exclusive relationship between services. It is only required to designate LabelExpression (the regular expression about Label) when deploying a service B, and thus various dependency relationships between services are resolved.

Step 202, selecting a target storage node from the at least one storage node.

In this embodiment, a target storage node for completing the target service is selected from the at least one storage node.

The tag information of the target storage node satisfies the storage node filtering condition in the expected service description information and/or the storage node filtering condition in the current service description information. The storage nodes of the service side forms a pool (storage node pool).

The user may mark the storage nodes with tag (one-dimensional) or property (two-dimensional and having a access control), to perform customized grouping on the storage nodes in the pool. When the service side deploys a service, it is only required to specify that a scheduling rule (i.e., the storage node filtering condition) is the combination of pool, tagExpression (the regular expression about tag) and propExpression (the expression based on a key and a value), to select a storage node group meeting the special demands of the user as the target storage node. The deployment of the service is completed on the selected target storage node.

The purpose of selecting the target storage node according to the storage node filtering conditions is to select two batches of storage nodes. One batch of storage nodes are selected according to the storage node filtering condition in the expected service description information. The other batch of storage nodes are selected according to the storage node filtering condition in the current service description information. The instance on the storage node that satisfies the expected storage node filtering condition and the current storage node filtering condition is a update operation or a migration operation. The instance on the storage node that satisfies the expected storage node filtering condition but does not satisfy the current storage node filtering condition is a creation operation. The instance on the storage node that does not satisfy the expected storage node filtering condition but satisfies the current storage node filtering condition is a deletion operation.

The storage node filtering condition is as follows: clusters: cluster A #identifier of a machine room; pools: pool A #identifier of the storage node pool; tagExpression: xxx #regular expression of the tag of the storage node; propExpressions: xxx #regular expression of the property of the storage node; and labelExpression: xxx #regular expression of the label of the instance.

In some alternative implementations of this embodiment, the storage node filtering condition includes at least one of: the identifier of the machine room, the identifier of the storage node pool, a filtering condition of the tag of the storage node, a filtering condition of the property of the storage node, or a filtering condition of the label of the instance. The above cluster, pool, tagExpresion, propExpression and labelExpression may be freely combined into the storage node filtering condition, to select the storage node meeting the special scheduling demands and resolving the service dependency relationship. For example, TagExpression=A, PropExpression=k1 in v1, and LabelExpression=X. This indicates that a storage node is selected as the target storage node, wherein the storage node has the tag A and the property in which the value of k1 is v1, and the label of the instance of the storage node is X. When the storage node filtering condition is TagExpression=B, and PropExpression=k1 not v1, it indicates that a storage node is selected as the target storage node, wherein the storage node has the tag B and the property in which the value of k1 is not v1, and the label of the instance of the storage node is an arbitrary value.

Step 203, determining a to-be-performed task of the target storage node, based on a difference between the expected service description information and the current service description information, and software package information and the container information in the expected service description information.

In this embodiment, the expected service description information and the current service description information are compared, to decompose the difference therebetween to operations, for example, a creation, a deletion, a update and a migration, on each instance, which greatly reduces the operational costs and improves the reliability. At the same time, according to the software package information and the container information in the expected service description information, these operations are combined into an online task for the target storage node to perform. The task includes not only the operations, but also parameters (e.g., the software package information and the container information in the expected service description information) used in the operations, so that the target storage node creates, deletes, updates and migrates the instance according to the container information. There is currently a one-to-one relationship between the instance and the container. The instance is a process running in the container. The operations are for the instance, but the creation for the container is completed as the instance is created. When creating the instance, the container is first created according to the container information, and the instance is then created in the container. When deleting the instance, the URL (uniform resource locator) of the storage node is first recycled (called back), to migrate data, and then the instance and the container are deleted after the migration of the data is completed. The update operation may refer to that various resources of the container are adjusted, that the software package of the instance is changed, or that some parameters (e.g., options and a timeout) of the instance are changed. The migration operation may refer to that the instance is first created on the target storage node, and the instance on the source storage node is then deleted after the creation is successful. Alternatively, the migration operation may refer to that the creation of the instance on the target storage node and the deletion of the instance on the source storage node are simultaneously performed.

The task mutual exclusion is the core function of the service hosting server, which guarantees that, for the same service, only one task runs at the same time, thus guaranteeing the eventual consistency of the service.

In some alternative implementations of this embodiment, the task includes at least one of: creating the instance, deleting the instance, updating the instance, or migrating the instance. For different target storage nodes, the tasks required to be performed may be identical or different. For example, for the target storage node A, the instance needs to be created. For the target storage node B, the instance needs to be deleted. Instance health inspection includes inspection on a default port and process, and further includes specifying a test script to inspect whether a service is successful. A health inspection script is provided by the user, the health inspection is performed on service dimensions, for example, inspecting whether a log is in line with expectations, and whether the calling of an interface is normal. The health inspection script is written into the software package. The configurations such as whether the health inspection script is called and the timeout of calling the health inspection script are written into the service description.

Step 204, sending information for indicating the task to the target storage node, to cause the target storage node to perform the task.

In this embodiment, the information for indicating the task may be directly sent to the target storage node, or the information for indicating the task may be indirectly sent to the target storage node through a cluster management server. The information for indicating the task includes not only the operations required to be performed by the target storage node, but also the parameters required in performing the operations, for example, the container information required when creating the instance. The cluster management server is placed in the IDC. The service hosting server may send a command to the cluster management server via an RPC (remote procedure call) interface. Then, the cluster management server notifies the target storage node through heartbeat. Various target storage nodes perform a task according to the task information received respectively, and jointly implement the target service.

In some alternative implementations of this embodiment, the service description information further includes grading release information. A grading release or a grayscale release generally refers to the process of a software product gradually expanding the traffic during an iteration, the grading performed each time is accompanied by a certain data index analysis, to decide whether to roll back or continue expanding a grayscale. In addition, the grading release or the grayscale release also refers to the grading process from a single instance, a part of instances to all of the instances during a continuous deployment.

Before the sending information for indicating the task to the target storage node, the method further includes the following steps.

Step 2041, decomposing the task into at least one operation. For example, the task of creating the instance may be decomposed into two operations: creating the container and creating the instance in the container. The task of migrating the instance may be decomposed into two operations in the target storage node: creating the container and creating the instance in the container, and two operations in the source storage node: deleting the instance and deleting the container.

Step 2042, generating a directed graph according to the grading release information in the expected service description information and the at least one operation. Here, a node of the directed graph represents an operation. The directed graph is an execution tree. The directed graph includes grading information described by the user. For example, when the storage node has a plurality of copies, it is possible to upgrade one copy first and then upgrade another copy, rather than upgrade all of the copies at the same time. The grading release information includes at least one of: grouping information of the operation, concurrent information of the operation, plan suspension information of the operation, or disaster tolerant information of the operation. The grouping information refers to information for grouping the storage node. For example, the grouping is performed through the tag of the storage node, the property of the storage node, and the label of the instance, and different groups may perform the operation in sequence. For example, the storage nodes 1, 2 and 3 belong to the first group, and the storage nodes 4, 5 and 6 belong to the second group. After the first group of storage nodes first creates the instance to implement the target service, the second group of storage nodes creates the instance to implement the target service. Thus, the grading release (also referred to as grayscale release) is achieved. The concurrent information of the operation refers to information for specifying a concurrency in a group, or information for specifying that different groups perform the operation at the same time. The plan suspension information of the operation refers to information for performing the operation after a verification on a result of a certain number of operations after the operations are completed. The disaster tolerant information of the operation refers to information for suspending the operation when a predetermined condition is satisfied. For example, when the failure rate of a certain operation reaches a threshold of 10%, the operation is suspended, to prevent the failure from expanding.

In some alternative implementations of this embodiment, the service description information further includes capacity expansion information. The method further includes: inspecting periodically a number of storage nodes having tag information satisfying the storage node filtering condition in the expected service description information from the at least one storage node. In response to inspecting the number of the storage nodes having the tag information satisfying the storage node filtering condition in the expected service description information from the at least one storage node increasing as compared with previous inspection, a to-be-newly-added target storage node is determined based on the capacity expansion information. The information for indicating the task is sent to the to-be-newly-added target storage node, to cause the to-be-newly-added target storage node to perform the task. The user may increase or reduce the number of the storage nodes running the instance by adjusting the tag information of the storage nodes. The tag information of an existing storage node may be changed, or a storage node may be newly added and a tag satisfying the storage node filtering condition in the expected service description information may be placed on the new storage node. For example, there are 100 storage nodes having the tag A to implement the service M, and 100 storage nodes having the tag B to implement the service N. Now, the tag of 50 storage nodes in the 100 storage nodes having the tag B may be modified to A. Thus, the capacity expansion of the service M is achieved, and the capacity reduction of the service N is achieved.

In some alternative implementations of this embodiment, the service description information further includes capacity reduction information. The method further includes: in response to inspecting the number of the storage nodes having the tag information satisfying the storage node filtering condition in the expected service description information from the at least one storage node decreasing as compared with the previous inspection, determining a to-be-reduced target storage node based on the capacity reduction information. An instruction for representing a deletion on an instance for the target service is sent to the to-be-reduced target storage node, to cause the to-be-reduced target storage node to delete the instance for the target service. The purpose of scaling out may be achieved by deleting the tag information of a part of the storage nodes.

When a storage node is required to be used, it is only required to change the Tag or Property of the storage node, rather than operate on the instance. At the same time, the storage system has characteristics different from other services, and the security and stability of the storage node is very important. There is no corresponding processing scheme for the storage hosting service of hundreds of thousands of storage nodes. Therefore, after the above automatic scaling mechanism is implemented, functions such as independent configurations of the capacity expansion and capacity reduction, a support for concurrency and a failure threshold are added, for ensuring the stability of data while ensuring the efficiently automatic capacity expansion and capacity reduction. The configurations of the automatic capacity expansion and the automatic capacity reduction are as follows: enabled: true #a master switch, whether to allow automatic capacity expansion and capacity reduction; enableScalingIn: true #a capacity expansion switch, whether to allow the automatic capacity expansion; scalingInDelayTimeSec: 1000 #how long does a machine take to expand capacity when it is found that the machine needs to expand capacity during the change; scalingInConcurrency: 5 #the concurrency of the operations at the time of the automatic capacity expansion; scalingInStopThreshold: 20 #the capacity expansion is stopped when the failure of the automatic capacity expansion exceeds a percentage; enableScalingOut: false #a capacity reduction switch, whether to allow the automatic capacity reduction; scalingOutDelayTimeSec: 1000 #how long does the machine take to reduce capacity when it is found that the machine needs to reduce capacity during the change; scalingOutConcurrency: 1 #the concurrency of the operations at the time of the automatic capacity reduction; and scalingOutStopThreshold: 10 #the capacity reduction is stopped when the failure of the automatic capacity reduction exceeds a percentage.

Figure 3:
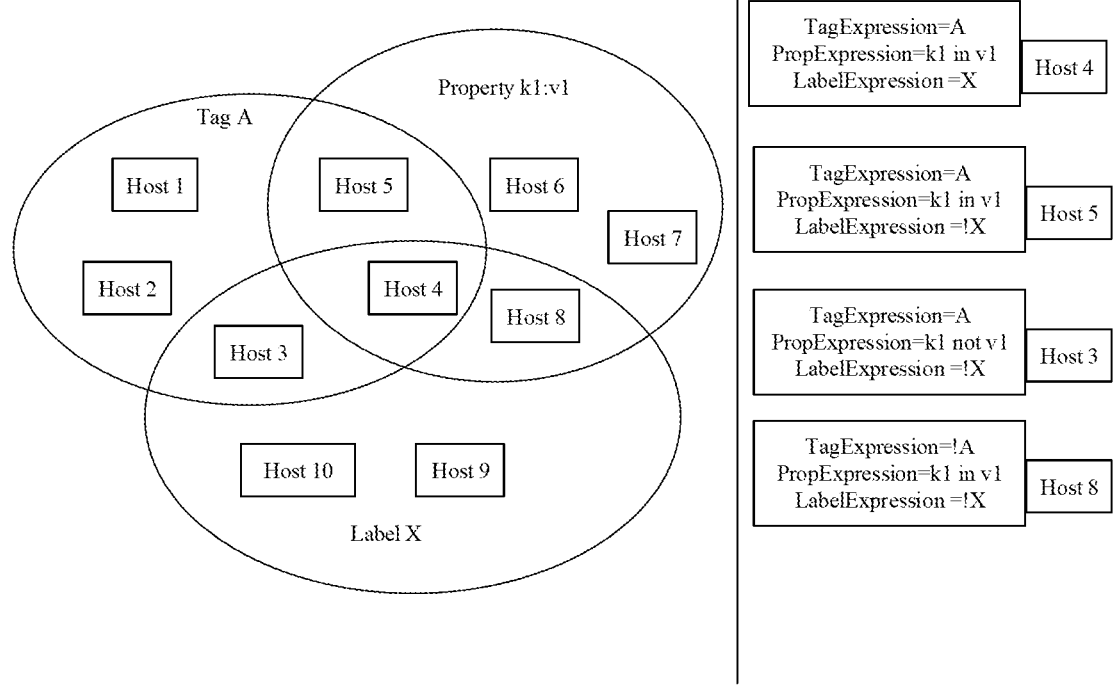
FIG. 3 is a schematic diagram of an application scenario of the method for service hosting of a distributed storage system according to the present disclosure.

Further referring to FIG. 3, FIG. 3 is a schematic diagram of an application scenario of the method for service hosting of a distributed storage system according to this embodiment. In the application scenario of FIG. 3, the distributed storage system includes 10 storage nodes, which are respectively host 1, host 2 . . . and host 10. Here, the tags of the hosts 1-5 as the storage nodes are A, the other hosts do not have a tag. The properties of the hosts 4-8 as the storage nodes are k1:v1. The tags (i.e., labels) of the instances running on the host 3, the host 4 and the hosts 8-10 are X. If the storage node filtering condition in the expected service description information or the current service description information is TagExpression=A, PropExpression=k1 in v1, and LabelExpression=X (i.e. the tag is A, the value of k1 in the property is v1 and the label is X), then the host 4 is selected as the target storage node. If the storage node filtering condition in the expected service description information or the current service description information is TagExpression=A, PropExpression=k1 in v1, and LabelExpression=!X (i.e. the tag is A, the value of k1 in the property is v1 and the label is not X), then the host 5 is selected as the target storage node. If the storage node filtering condition in the expected service description information or the current service description information is TagExpression=A, PropExpression=k1 not v1, and LabelExpression=X (i.e. the tag is A, the value of k1 in the property is not v1 and the label is X), then the host 3 is selected as the target storage node. If the storage node filtering condition in the expected service description information or the current service description information is TagExpression=! A, PropExpression=k1 in v1, and LabelExpression=X (i.e. the tag is not A, the value of k1 in the property is v1 and the label is X), then the host 8 is selected as the target storage node.

A to-be-performed task of each target storage node is determined based on the difference between the expected service description information and the current service description information and the expected service description information. Information for indicating the task is sent to each target storage node, to cause the target storage node to perform the task.

According to the method provided by the above embodiment of the present disclosure, the target storage node is selected through the difference between the expected service description information and the current service description information, to perform the task, and thus, the virtualized hosting of the storage node is implemented with the container technology.

Figure 4:
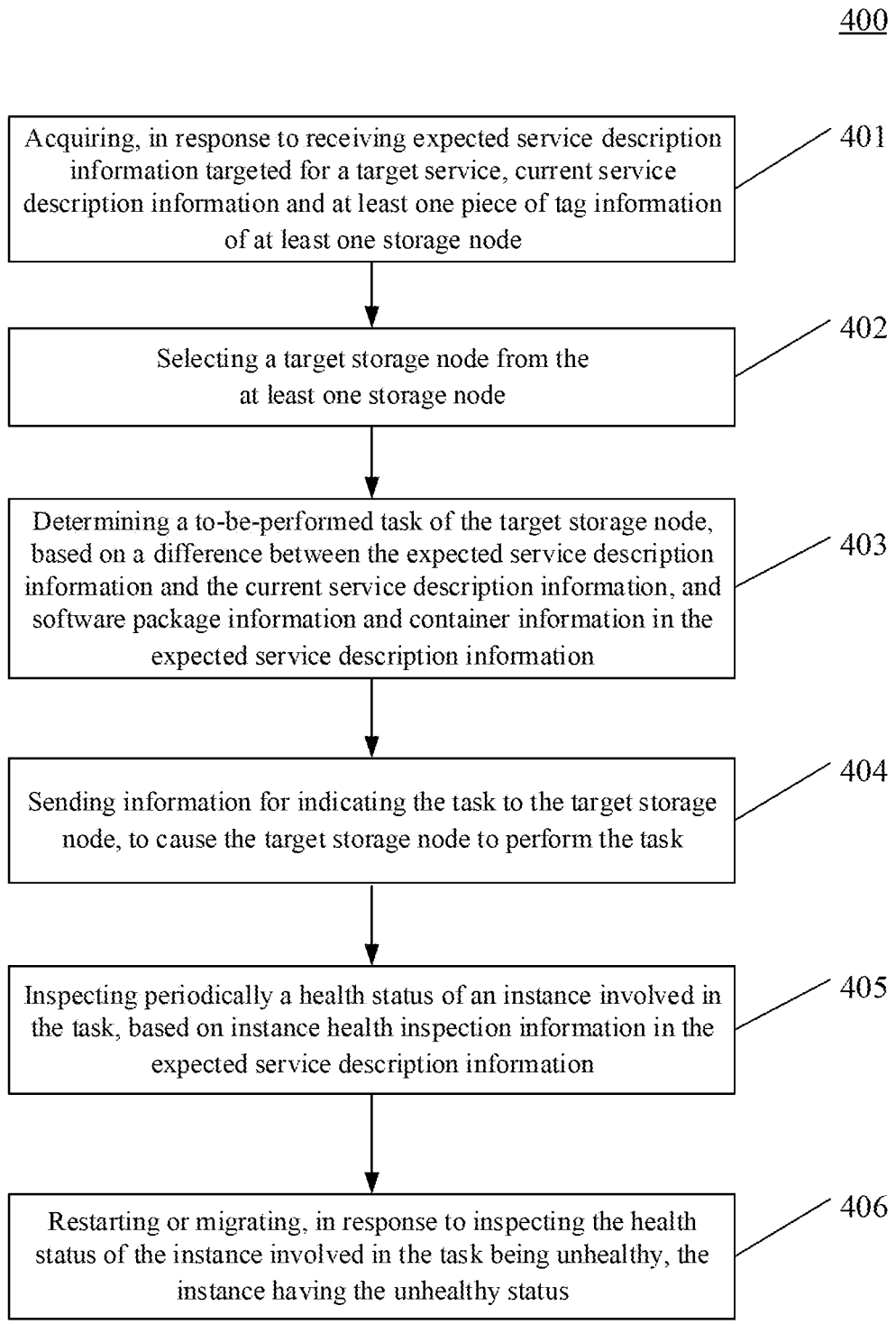
FIG. 4 is a flowchart of another embodiment of the method for service hosting of a distributed storage system according to the present disclosure.

Further referring to FIG. 4, FIG. 4 illustrates a flow 400 of another embodiment of the method for service hosting of a distributed storage system. The flow 400 of the method for service hosting of a distributed storage system includes the following steps.

Step 401, acquiring, in response to receiving expected service description information for a target service, current service description information and at least one piece of tag information of at least one storage node.

Step 402, selecting a target storage node from the at least one storage node.

Step 403, determining a to-be-performed task of the target storage node, based on a difference between the expected service description information and the current service description information, and software package information and container information in the expected service description information.

Step 404, sending information for indicating the task to the target storage node, to cause the target storage node to perform the task.

Steps 401-404 are substantially the same as steps 201-204, which will not be repeatedly described here.

Step 405, inspecting periodically a health status of an instance involved in the task, based on instance health inspection information in the expected service description information.

In this embodiment, the service description information further includes interface information. Through the interface information, a user predefines positions of a start script, a stop script and a health inspection script of a service progress, which are described as follows: START: /path/to/start/script #service start command/script of the user; STOP: /path/to/stop/script #service stop command/script of the user; and STATUS: /path/to/health/inspection/script #service health inspection command/script of the user.

The above scripts are called for the user to perform a start, a stop, and a health inspection. When the health inspection script of the user is called, if the script returns nonzero, the health status is unhealthy. At the same time, there is a default health inspection to inspect whether the port requested by the user is opened and whether the progress is present. If the port is not opened, and the progress is not present, it indicates that the health status is unhealthy, too.

Step 406, restarting or migrating, in response to inspecting the health status of the instance involved in the task being unhealthy, the instance having the unhealthy status.

In this embodiment, the service description information further includes keep-alive information. There are two ways to keep alive: restarting and migrating. Restarting to keep alive is initiated in place, and no new creation is performed. That is, the progress of the instance is stopped and then pulled up again. Migrating to keep alive is to perform a deletion on the machine A, and perform a re-creation on the machine B. The health status of the instance is calculated by calling the status script of the user, and the restarting for the service is completed by calling the start script and the stop script of the user. The keep-alive information for automatically keeping alive is as follows: #a keep-alive master switch, not enabled by default, enabled: false; #amaximum number of retries, maxRetryCount: 3; #a delay of keep-alive time, and an interval between a plurality of keep-alive operations, delayKeepAliveTimeSec: 600; #a maximum concurrency of the keep-alive operations, an actual concurrency is a smaller value of the maximum concurrency and a service redundancy, the service redundancy refers to a number of storage nodes not performing a service task, maxConcurrency: 500; #whether to allow a restart when the keep-alive operation is performed, enabled by default, enableRestart: true; #whether to allow an automatic migration when the keep-alive operation is performed, not enabled by default, enableMigrate: false; #a timeout of the deletion operation of single instance migration keep-alive, at the time of the single instance migration keep-alive, the original instance is deleted, a new instance is then created after the deletion is successful, and if the deletion is still not successful when the timeout is reached, the new instance is still created, deleteTimeoutSec: 600; and #whether to perform the keep-alive operation during the task, not enabled by default, enableDuringTask: false.

Figure 5:
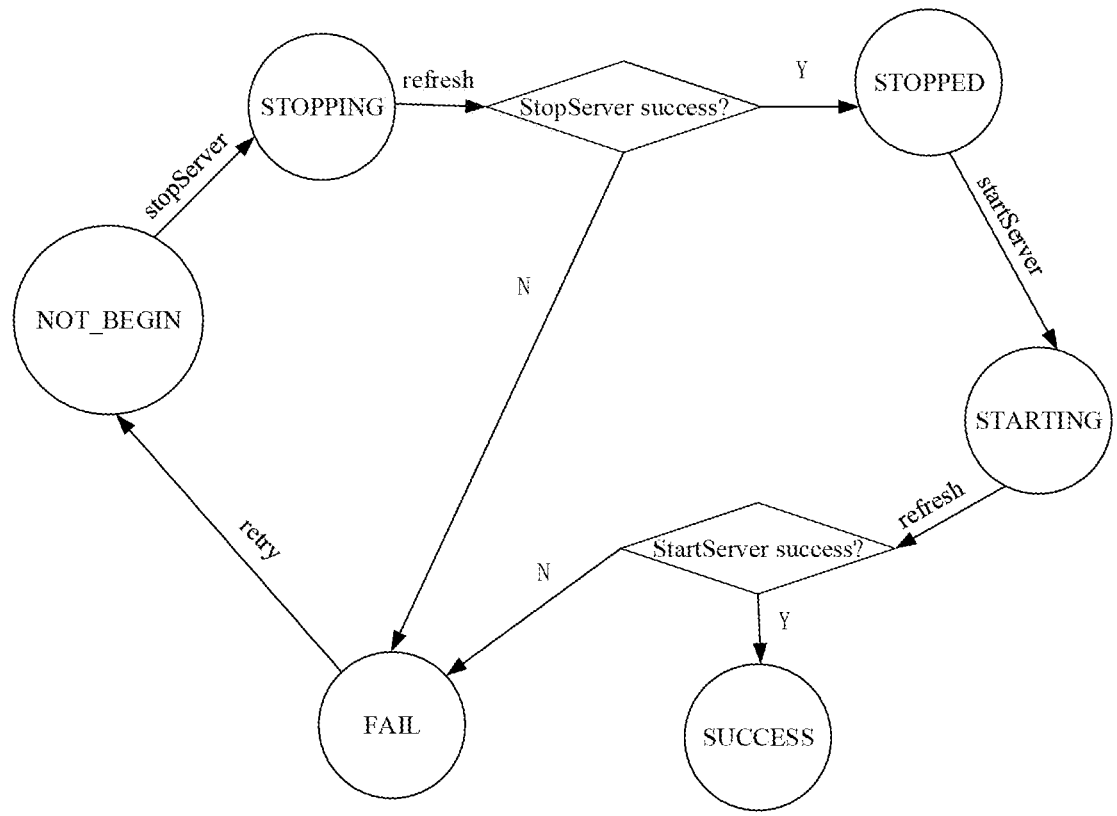
FIG. 5 is a schematic diagram of another application scenario of the method for service hosting of a distributed storage system according to the present disclosure.

The application scenario shown in FIG. 5 is the flow of the service keep-alive. NOT BEGIN indicates that the keep-alive does not begin. The stopserver operation is performed to enter the STOPPING status. Then, the refresh operation is performed to determine whether the stopserver is successful. If the stopserver is successful, the status of the service changes to STOPPED; if the stopserver fails, the status of the service changes to FAIL (keep-alive fails). After the status of the service changes to STOPPED, the startserver operation is performed to enter the STARING status, and then whether the startserver is successful is determined. If the startserver is successful, the status of the service changes to SUCCESS (keep alive is successful), and thus, the keep-alive process is completed. If the startserver fails, the status of the service changes to FAIL (keep-alive fails). The service in the FAIL status continues to retry the keep-alive process. The keep-alive is not ended until the keep-alive is successful or the maximum number of keep-alive operations is reached.

It may be seen from FIG. 4 that, as compared with the embodiment corresponding to FIG. 2, the flow 400 of the method for service hosting of a distributed storage system in this embodiment emphasizes the step of performing keep-alive on the service. Thus, the scheme described in this embodiment may improve the stability of the service.

Figure 6:
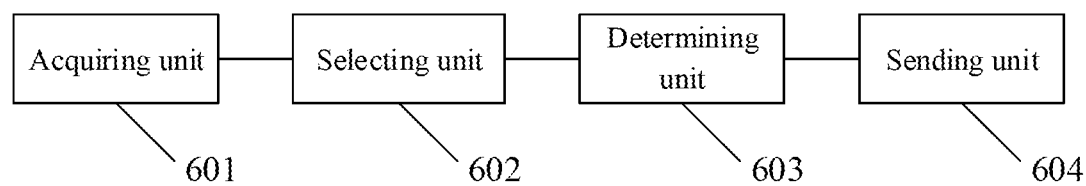
FIG. 6 is a schematic structural diagram of an embodiment of an apparatus for service hosting of a distributed storage system according to the present disclosure.

Further referring to FIG. 6, as an implementation of the method shown in the above drawings, the present disclosure provides an embodiment of an apparatus for service hosting of a distributed storage system. The embodiment of the apparatus corresponds to the embodiment of the method shown in FIG. 2, and the apparatus may be applied in various electronic devices.

As shown in FIG. 6, the apparatus 600 for service hosting of a distributed storage system in this embodiment includes: an acquiring unit 601, a selecting unit 602, a determining unit 603 and a sending unit 604. The acquiring unit 601 is configured to acquire, in response to receiving expected service description information for a target service, current service description information and at least one piece of tag information of at least one storage node, service description information including: software package information, container information and a storage node filtering condition. The selecting unit 602 is configured to select a target storage node from the at least one storage node, tag information of the target storage node satisfying a storage node filtering condition in the expected service description information and/or a storage node filtering condition in the current service description information. The determining unit 603 is configured to determine a to-be-performed task of the target storage node, based on a difference between the expected service description information and the current service description information and software package information and container information in the expected service description information. The sending unit 604 is configured to send information for indicating the task to the target storage node, to cause the target storage node to perform the task.

In this embodiment, for specific processes of the acquiring unit 601, the selecting unit 602, the determining unit 603 and the sending unit 604 in the apparatus 600 for service hosting of a distributed storage system, reference may be made to step 201, step 202, step 203 and step 204 in the corresponding embodiment of FIG. 2.

In some alternative implementations of this embodiment, the task includes at least one of: creating an instance, deleting the instance, updating the instance or migrating the instance.

In some alternative implementations of this embodiment, the service description information further includes grading release information. The sending unit 604 is further configured to: decompose the task into at least one operation before the information for indicating the task is sent to the target storage node; and generate a directed graph according to grading release information in the expected service description information and the at least one operation, a node of the directed graph representing an operation.

In some alternative implementations of this embodiment, the grading release information includes at least one of: grouping information of the operation, concurrent information of the operation, plan suspension information of the operation, or disaster tolerant information of the operation.

In some alternative implementations of this embodiment, the tag information includes at least one of: a tag of the storage node, a property of the storage node or a label of an instance. The storage node filtering condition includes at least one of: an identifier of a machine room, an identifier of a storage node pool, a filtering condition of the tag of the storage node, a filtering condition of the property of the storage node, or a filtering condition of the label of the instance.

In some alternative implementations of this embodiment, the service description information further includes capacity expansion information. The apparatus 600 further includes a capacity expansion and capacity reduction unit (not shown), configured to: inspect periodically a number of storage nodes having tag information satisfying the storage node filtering condition in the expected service description information from the at least one storage node; determine a to-be-newly-added target storage node based on the capacity expansion information, in response to inspecting the number of the storage nodes having the tag information satisfying the storage node filtering condition in the expected service description information from the at least one storage node increasing as compared with a previous inspection; and send the information for indicating the task to the to-be-newly-added target storage node, to cause the to-be-newly-added target storage node to perform the task.

In some alternative implementations of this embodiment, the service description information further includes capacity reduction information. The capacity expansion and capacity reduction unit is further configured to: determine a to-be-reduced target storage node based on the capacity reduction information, in response to inspecting the number of the storage nodes having the tag information satisfying the storage node filtering condition in the expected service description information from the at least one storage node decreasing as compared with the previous inspection; and send an instruction for representing a deletion on an instance for the target service to the to-be-reduced target storage node, to cause the to-be-reduced target storage node to delete the instance for the target service.

In some alternative implementations of this embodiment, the service description information further includes instance health inspection information. The apparatus further includes a health inspecting unit (not shown), configured to: inspect periodically a health status of an instance involved in the task, based on instance health inspection information in the expected service description information.

In some alternative implementations of this embodiment, the service description information further includes keep-alive information. The apparatus further includes a keep-alive unit (not shown), configured to: in response to inspecting the health status of the instance involved in the task being unhealthy, restart or migrate the instance having the unhealthy status according to the keep-alive information.

Figure 7:
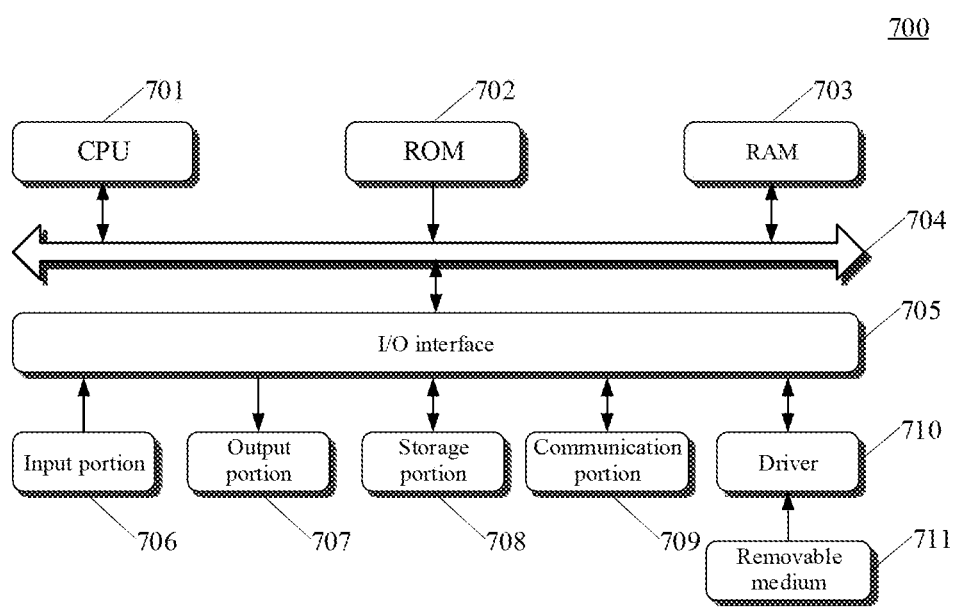
FIG. 7 is a schematic structural diagram of a computer system adapted to implement an electronic device according to the embodiments of the present disclosure.

Referring to FIG. 7, FIG. 7 is a schematic structural diagram of a computer system 700 adapted to implement an electronic device (e.g., the service hosting server shown in FIG. 1) of the embodiments of the present disclosure. The electronic device shown in FIG. 7 is merely an example, and should not bring any limitations to the functions and the scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse, etc.; an output portion 707 including a cathode ray tube (CRT), a liquid crystal display device (LCD), a speaker, etc.; a storage portion 708 including a hard disk or the like; and a communication portion 709 including a network interface card such as a LAN card and a modem. The communication portion 709 performs communication processes via a network such as the Internet. A driver 710 is also connected to the I/O interface 705 as required. A removable medium 711 such as a magnetic disk, an optical disk, a magneto-optical disk, and a semiconductor memory may be installed on the driver 710, to facilitate the retrieval of a computer program from the removable medium 711, and the installation thereof on the storage portion 708 as needed.

In particular, according to embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 709, and/or may be installed from the removable medium 711. The computer program, when executed by the central processing unit (CPU) 701, implements the above mentioned functionalities defined in the method of the present disclosure. It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above.

A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above.

In the present disclosure, the computer readable storage medium may be any physical medium containing or storing programs, which may be used by an instruction execution system, apparatus or element or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, the instruction execution system, apparatus or element. The program codes contained on the computer readable medium may be transmitted with any suitable medium including, but not limited to, wireless, wired, optical cable, RF medium, or any suitable combination of the above.

A computer program code for executing the operations according to the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone software package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the function involved. It should also be noted that each block in the block diagrams and/or flowcharts as well as a combination of blocks may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor. For example, the processor may be described as: a processor comprising an acquiring unit, a selecting unit, a determining unit and a sending unit. The names of these units do not in some cases constitute a limitation to such units themselves. For example, the acquiring unit may also be described as "a unit for acquiring, in response to receiving expected service description information for a target service, current service description information and at least one piece of tag information of at least one storage node."

In another aspect, the present disclosure further provides a computer readable medium. The computer readable medium may be the computer readable medium included in the apparatus described in the above embodiments, or a stand-alone computer readable medium not assembled into the apparatus. The computer readable medium stores one or more programs. The one or more programs, when executed by the apparatus, cause the apparatus to: acquire, in response to receiving expected service description information for a target service, current service description information and at least one piece of tag information of at least one storage node, service description information including: software package information, container information and a storage node filtering condition; select a target storage node from the at least one storage node, tag information of the target storage node satisfying a storage node filtering condition in the expected service description information and/or a storage node filtering condition in the current service description information; determine a to-be-performed task of the target storage node, based on a difference between the expected service description information and the current service description information, and software package information and container information in the expected service description information; and send information for indicating the task to the target storage node, to cause the target storage node to perform the task.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A method for service hosting of a distributed storage system, comprising:

acquiring, in response to receiving expected service description information for a target service, current service description information and at least one piece of tag information of at least one storage node, service description information including: software package information, container information, a storage node filtering condition, and grading release information;

selecting a target storage node from the at least one storage node, tag information of the target storage node satisfying a storage node filtering condition in the expected service description information and/or a storage node filtering condition in the current service description information;

determining a to-be-performed task of the target storage node, based on a difference between the expected service description information and the current service description information, and software package information and container information in the expected service description information;

decomposing the task into at least one operation;

generating a directed graph according to grading release information in the expected service description information and the at least one operation, a node of the directed graph representing an operation, wherein the grading release information includes at least one of: grouping information of the operation, concurrent information of the operation, plan suspension information of the operation, or disaster tolerant information of the operation; and sending information for indicating the task to the target storage node, to cause the target storage node to perform the task.

2. The method according to claim 1, wherein the task includes at least one of: creating an instance, deleting the instance, updating the instance or migrating the instance.

3. The method according to claim 1, wherein the tag information includes at least one of: a tag of the storage node, a property of the storage node or a label of an instance, and the storage node filtering condition includes at least one of: an identifier of a machine room, an identifier of a storage node pool, a filtering condition of the tag of the storage node, a filtering condition of the property of the storage node, or a filtering condition of the label of the instance.

4. The method according to claim 1, wherein the service description information further includes capacity expansion information, and
the method further comprises:
inspecting periodically a number of storage nodes having tag information satisfying the storage node filtering condition in the expected service description information from the at least one storage node;
determining a to-be-newly-added target storage node based on the capacity expansion information, in response to inspecting the number of the storage nodes having the tag information satisfying the storage node filtering condition in the expected service description information from the at least one storage node increasing as compared with a previous inspection; and
sending the information for indicating the task to the to-be-newly-added target storage node, to cause the to-be-newly-added target storage node to perform the task.

5. The method according to claim 4, wherein the service description information further includes capacity reduction information, and
the method further comprises:
determining a to-be-reduced target storage node based on the capacity reduction information, in response to inspecting the number of the storage nodes having the tag information satisfying the storage node filtering condition in the expected service description information in the at least one storage node decreasing as compared with the previous inspection; and
sending an instruction for representing a deletion on an instance for the target service to the to-be-reduced target storage node, to cause the to-be-reduced target storage node to delete the instance for the target service.

6. The method according to claim 1, wherein the service description information further includes instance health inspection information, and
the method further comprises:
inspecting periodically a health status of an instance involved in the task, based on instance health inspection information in the expected service description information.

7. The method according to claim 6, wherein the service description information further includes keep-alive information, and
the method further comprises:
restarting or migrating, in response to inspecting the health status of the instance involved in the task being unhealthy, the instance having the unhealthy status according to the keep-alive information.

8. An apparatus for service hosting of a distributed storage system, comprising:
at least one processor; and
a memory storing instructions, the instructions when executed by the at least one processor, cause the at least one processor to perform operations, the operations comprising:
acquiring, in response to receiving expected service description information for a target service, current service description information and at least one piece of tag information of at least one storage node, service description information including: software package information, container information, a storage node filtering condition, and grading release information;
selecting a target storage node from the at least one storage node, tag information of the target storage node satisfying a storage node filtering condition in the expected service description information and/or a storage node filtering condition in the current service description information;
determining a to-be-performed task of the target storage node, based on a difference between the expected service description information and the current service description information, and software package information and container information in the expected service description information;
decomposing the task into at least one operation;
generating a directed graph according to grading release information in the expected service description information and the at least one operation, a node of the directed graph representing an operation, wherein the grading release information includes at least one of:
grouping information of the operation, concurrent information of the operation, plan suspension information of the operation, or disaster tolerant information of the operation; and
sending information for indicating the task to the target storage node, to cause the target storage node to perform the task.

9. The apparatus according to claim 8, wherein the task includes at least one of: creating an instance, deleting the instance, updating the instance or migrating the instance.

10. The apparatus according to claim 8, wherein the tag information includes at least one of: a tag of the storage node, a property of the storage node or a label of an instance, and the storage node filtering condition includes at least one of: an identifier of a machine room, an identifier of a storage node pool, a filtering condition of the tag of the storage node, a filtering condition of the property of the storage node, or a filtering condition of the label of the instance.

11. The apparatus according to claim 8, wherein the service description information further includes capacity expansion information, and
the operations further comprise:
inspecting periodically a number of storage nodes having tag information satisfying the storage node filtering condition in the expected service description information from the at least one storage node;
determining a to-be-newly-added target storage node based on the capacity expansion information, in response to inspecting the number of the storage nodes having the tag information satisfying the storage node filtering condition in the expected service description information from the at least one storage node increasing as compared with a previous inspection; and
sending the information for indicating the task to the to-be-newly-added target storage node, to cause the to-be-newly-added target storage node to perform the task.

12. The apparatus according to claim 11, wherein the service description information further includes capacity reduction information, and
the operations further comprise:
determining a to-be-reduced target storage node based on the capacity reduction information, in response to inspecting the number of the storage nodes having the tag information satisfying the storage node filtering condition in the expected service description information from the at least one storage node decreasing as compared with the previous inspection; and sending an instruction for representing a deletion on an instance for the target service to the to-be-reduced target storage node, to cause the to-be-reduced target storage node to delete the instance for the target service.

13. The apparatus according to claim 8, wherein the service description information further includes instance health inspection information, and the operations further comprise:

inspecting periodically a health status of an instance involved in the task, based on instance health inspection information in the expected service description information.

14. The apparatus according to claim 13, wherein the service description information further includes keep-alive information, and the operations further comprise:

restarting or migrating, in response to inspecting the health status of the instance involved in the task being unhealthy, the instance having the unhealthy status according to the keep-alive information.

15. A non-transitory computer readable medium, storing a computer program, wherein the computer program, when executed by a processor, causes the processor to perform operations, the operations comprising:

acquiring, in response to receiving expected service description information for a target service, current service description information and at least one piece of tag information of at least one storage node, service description information including: software package information, container information, a storage node filtering condition, and grading release information;

selecting a target storage node from the at least one storage node, tag information of the target storage node satisfying a storage node filtering condition in the expected service description information and/or a storage node filtering condition in the current service description information;

determining a to-be-performed task of the target storage node, based on a difference between the expected service description information and the current service description information, and software package information and container information in the expected service description information;

decomposing the task into at least one operation;

generating a directed graph according to grading release information in the expected service description information and the at least one operation, a node of the directed graph representing an operation, wherein the grading release information includes at least one of: grouping information of the operation, concurrent information of the operation, plan suspension information of the operation, or disaster tolerant information of the operation; and sending information for indicating the task to the target storage node, to cause the target storage node to perform the task.

* * * * *